United States Patent
Imura

(10) Patent No.: US 12,128,850 B2
(45) Date of Patent: Oct. 29, 2024

(54) VEHICLE OCCUPANT RESTRAINT DEVICE

(71) Applicant: TOYOTA JIDOSHA KABUSHIKI KAISHA, Toyota (JP)

(72) Inventor: Kazuo Imura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/531,688

(22) Filed: Dec. 7, 2023

(65) Prior Publication Data

US 2024/0253590 A1 Aug. 1, 2024

(30) Foreign Application Priority Data

Jan. 31, 2023 (JP) ................................. 2023-013500

(51) Int. Cl.
*B60R 21/2338* (2011.01)
*B60R 21/207* (2006.01)

(52) U.S. Cl.
CPC ........ *B60R 21/2338* (2013.01); *B60R 21/207* (2013.01)

(58) Field of Classification Search
CPC .. B60R 21/2338; B60R 21/207; B60R 21/233
See application file for complete search history.

(56) References Cited

U.S. PATENT DOCUMENTS

| | | | | |
|---|---|---|---|---|
| 10,850,699 B2* | 12/2020 | Dry | ....................... | B60R 21/207 |
| 11,186,245 B2* | 11/2021 | Kadam | .................. | B60R 21/207 |
| 11,247,633 B1* | 2/2022 | Schneider | ............. | B60R 21/207 |
| 11,285,904 B2* | 3/2022 | Jung | .................... | B60R 21/2338 |
| 11,618,404 B1* | 4/2023 | Jaradi | ............... | B60R 21/23138 |
| | | | | 280/730.1 |
| 2019/0283700 A1* | 9/2019 | Kwon | .................. | B60R 21/2338 |
| 2020/0094772 A1* | 3/2020 | Markusic | ............ | B60R 21/2334 |
| 2021/0094499 A1* | 4/2021 | Deng | .................... | B60R 21/261 |

FOREIGN PATENT DOCUMENTS

| | | | | | |
|---|---|---|---|---|---|
| CN | 114641414 A | * | 6/2022 | .......... | B60R 21/207 |
| CN | 115768662 A | * | 3/2023 | ....... | B60R 21/23138 |
| DE | 102019113041 A1 | * | 11/2020 | | |
| DE | 202022103129 U1 | * | 8/2022 | .......... | B60R 21/207 |
| DE | 102023125341 A1 | * | 4/2024 | .......... | B60R 21/207 |
| EP | 3718833 A1 | * | 10/2020 | .............. | B60N 2/42 |

(Continued)

*Primary Examiner* — Nicole T Verley
(74) *Attorney, Agent, or Firm* — SOLARIS Intellectual Property Group, PLlC

(57) ABSTRACT

A vehicle occupant restraint device including: a vehicle seat; a center airbag that is provided at a side portion at a vehicle width direction inner side of a seat back of the vehicle seat, and is configured to inflate and deploy toward a vehicle width direction inner side of an occupant seated at the vehicle sea; and a cord-shaped member, a bifurcated one end portion of the cord-shaped member being respectively attached to an upper portion and a lower portion of a side surface at an occupant side of the center airbag and being movably supported at the side portion of the seat back, and another end portion of the cord-shaped member being attached to a retraction device and being retracted by the retraction device at a timing at which the occupant is restrained by the inflated and deployed center airbag.

5 Claims, 5 Drawing Sheets

(56) References Cited

FOREIGN PATENT DOCUMENTS

| EP | 3747707 B1 * | 1/2022 | ........... B60R 21/207 |
| --- | --- | --- | --- |
| JP | 2017030638 A * | 2/2017 | |
| JP | 2020-131792 A | 8/2020 | |
| KR | 2020029334 A * | 3/2020 | ........... B60R 21/207 |
| WO | WO-2004050435 A1 * | 6/2004 | ........... B60R 21/214 |
| WO | WO-2019107398 A1 * | 6/2019 | ............... B60N 2/42 |
| WO | WO-2020017282 A1 * | 1/2020 | |
| WO | WO-2021111723 A1 * | 6/2021 | ........... B60R 21/207 |
| WO | 2021/176895 A1 | 9/2021 | |

* cited by examiner

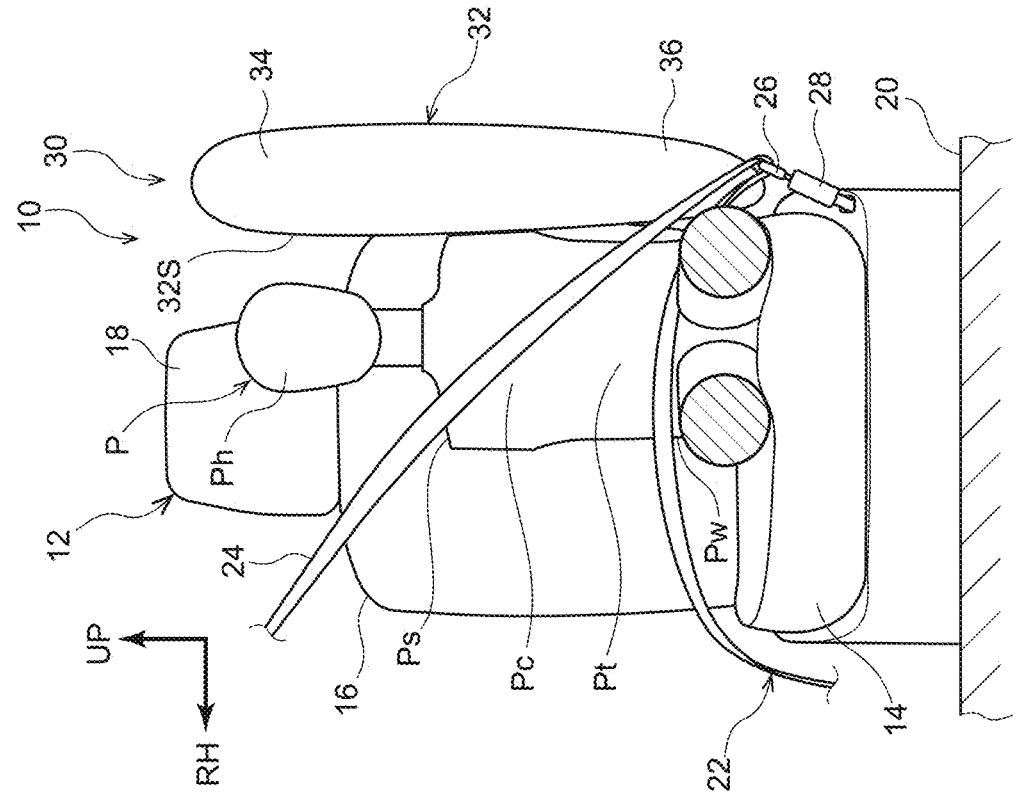
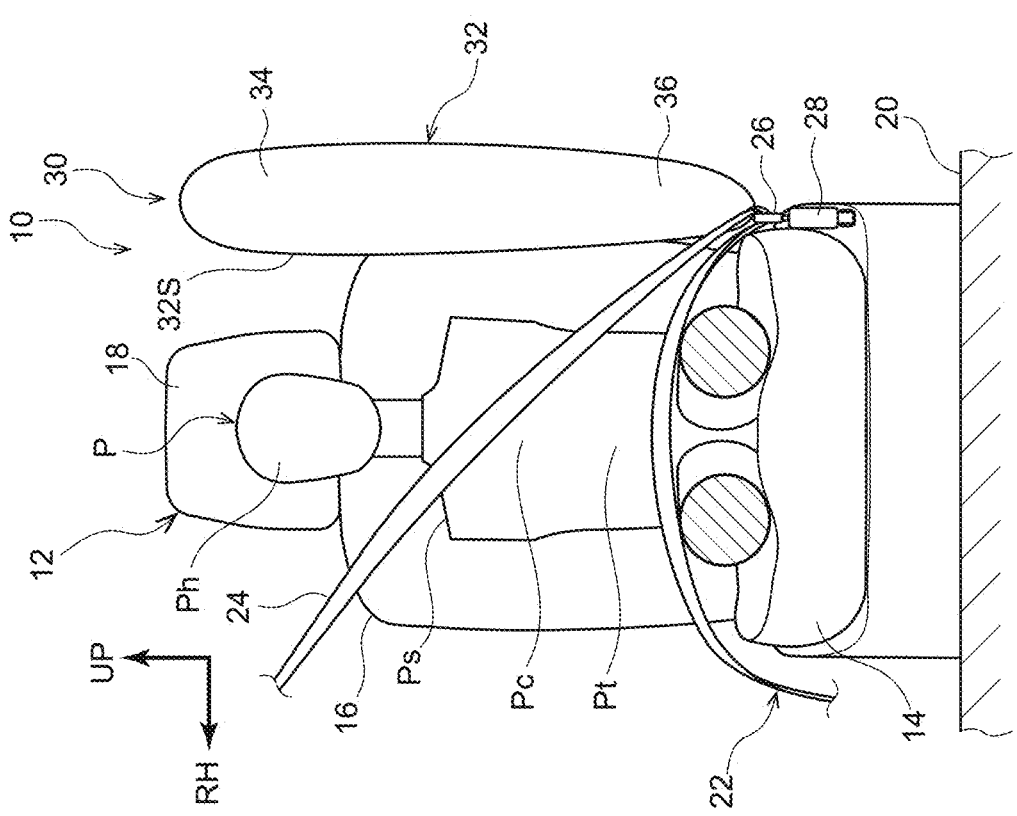

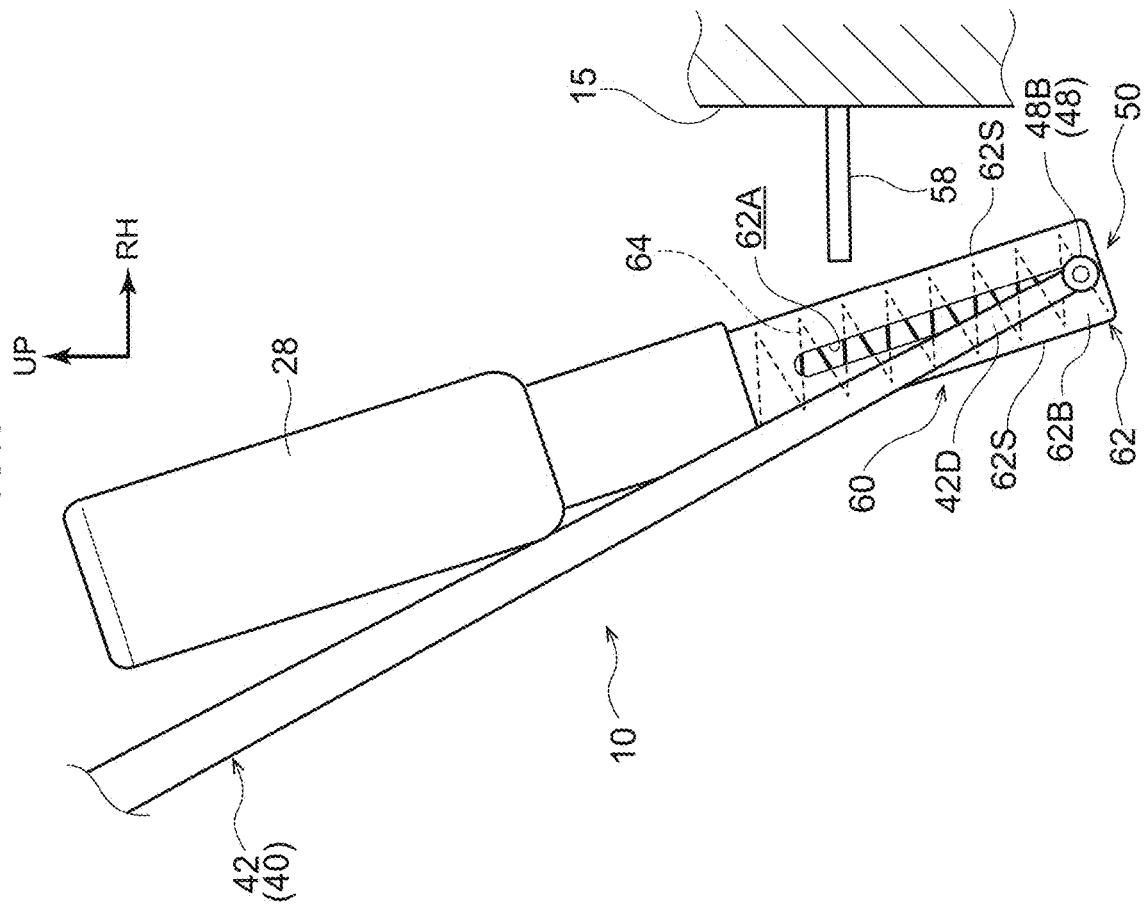
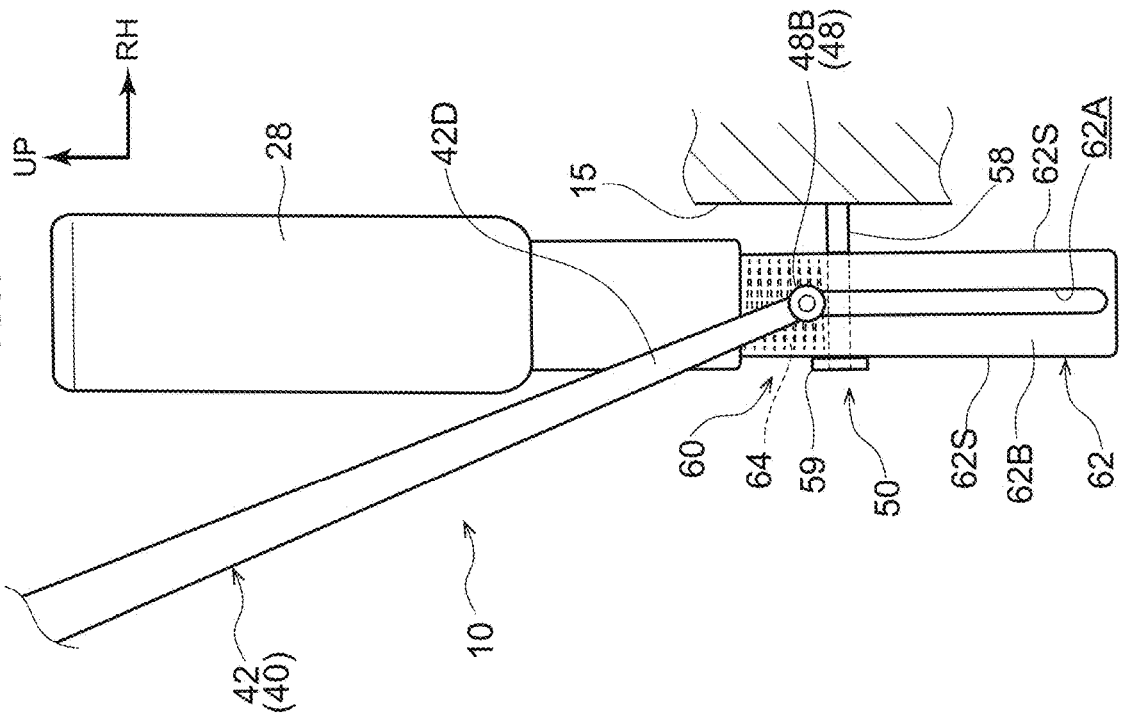

VEHICLE OCCUPANT RESTRAINT DEVICE

CROSS-REFERENCE TO RELATED APPLICATION

This application is based on and claims priority under 35 USC 119 from Japanese Patent Application No. 2023-013500, filed on Jan. 31, 2023, the disclosure of which is incorporated by reference herein.

BACKGROUND

Technical Field

The present disclosure relates to a vehicle occupant restraint device.

Related Art

An occupant protection device is conventionally known that includes a tether connecting a center airbag and either one of a left or right seat and pulling the center airbag after inflation and deployment toward that one seat side, and that is configured so as to control a tension of the tether in accordance with a front-rear positional relationship between seat backs of the left and right seats (refer to, for example, Japanese Patent Application Laid-Open (JP-A) No. 2020-131792).

Incidentally, in a case in which a lower end portion of the center airbag that has been inflated and deployed does not sufficiently overlap with a console box in a side view, or, in other words, in a case in which the vehicle seat is positioned at a front side position at which a front end surface of a side portion of the seat back is positioned further toward a front side than a front surface of the console box, there is a possibility that an occupant who moves toward a vehicle width direction inner side due to inertial force caused by a side collision of a vehicle will collapse (fall over) toward the vehicle width direction inner side together with the center airbag since the center airbag cannot obtain sufficient reaction force from the console box.

Namely, in the case of an occupant having a small build who positions the vehicle seat at the front side position, in plan view, the inflated and deployed center airbag may rotate toward the vehicle width direction inner side with a rear end portion thereof as a center of rotation, and there is a risk that it will become difficult to restrain the occupant with the inflated and deployed center airbag. As such, there is still room for improvement with regard to a configuration that suppresses rotational behavior of a center airbag that inflates and deploys from a side portion at a vehicle width direction inner side of a seat back of a vehicle seat toward a vehicle width direction inner side of an occupant, even when the vehicle seat is at a front side position.

SUMMARY

Thus, an object of the present disclosure is to obtain a vehicle occupant restraint device that can suppress rotational behavior of a center airbag that inflates and deploys from a side portion at a vehicle width direction inner side of a seat back toward a vehicle width direction inner side of an occupant, even when a vehicle seat is at a front side position.

In order to achieve the above-described object, a vehicle occupant restraint device of a first aspect of the present disclosure includes: a vehicle seat that is provided in a vehicle cabin so as to be movable in a vehicle front-rear direction; a center airbag that is provided at a side portion at a vehicle width direction inner side of a seat back of the vehicle seat, and that inflates and deploys toward a vehicle width direction inner side of an occupant seated at the vehicle seat due to gas that has been ejected from an inflator being supplied to an interior of the center airbag; and a cord-shaped member, a bifurcated one end portion of the cord-shaped member being respectively attached to an upper portion and a lower portion of a side surface at an occupant side of the center airbag and being movably supported at the side portion of the seat back, and another end portion of the cord-shaped member being attached to a retraction device and being retracted by the retraction device at a timing at which the occupant is restrained by the inflated and deployed center airbag.

According to the disclosure of the first aspect, the inflator is actuated at a time of a side collision of the vehicle, and the gas that has been ejected from the inflator is supplied to the interior of the center airbag. As a result, the center airbag inflates and deploys toward the vehicle width direction inner side of the occupant seated at the vehicle seat. It should be noted that "a time of a side collision of the vehicle" not only includes a time when a side collision of the vehicle has been detected, but also includes a time when a side collision of the vehicle has been predicted.

When the occupant seated at the vehicle seat (particularly a driver's seat) is an occupant having a small build, the vehicle seat may be at a front side position at which a front end surface of the side portion of the seat back is positioned further toward the vehicle front side than a front surface of a console box in a side view. In such a case, the inflated and deployed center airbag is less likely to obtain a reaction force from the console box.

However, the bifurcated one end portion of the cord-shaped member is respectively attached to the upper portion and the lower portion of the side surface at the occupant side of the center airbag, and the cord-shaped member is movably supported at the side portion of the seat back. Further, the other end portion of the cord-shaped member is attached to the retraction device, and the cord-shaped member is configured so as to be retracted by the retraction device at the timing at which the occupant is restrained by the inflated and deployed center airbag.

Accordingly, even if the lower end portion of the center airbag does not sufficiently overlap with the console box in a side view, the center airbag is pulled toward the seat width direction inner side about a rear end portion of the center airbag as a rotation center in a plan view, and therefore, rotational behavior (collapse) toward the seat width direction outer side about the rear end portion of the center airbag as a rotation center is suppressed. Namely, even when the vehicle seat is at the front side position, rotational behavior of the center airbag that inflates and deploys from the side portion at the vehicle width direction inner side of the seat back toward the vehicle width direction inner side of the occupant is suppressed, and the occupant is effectively restrained by the center airbag.

Further, a vehicle occupant restraint device of a second aspect of the present disclosure is the vehicle occupant restraint device of the first aspect, wherein the retraction device is configured by a pretensioner device that is provided at the vehicle seat or a vehicle body.

According to the disclosure of the second aspect, the retraction device is configured by the pretensioner device that is provided at the vehicle seat or the vehicle body. Accordingly, the cord-shaped member can be retracted at an appropriate timing that is different from an inflation and deployment timing of the center airbag, as compared to a case in which the retraction device is not configured by the pretensioner device, and rotational behavior of the center airbag is suppressed at an appropriate timing that enables the occupant moving toward the vehicle width direction inner side to be effectively restrained.

Further, a vehicle occupant restraint device of a third aspect of the present disclosure is the vehicle occupant restraint device of the first aspect, wherein: the retraction device includes an urging member that is provided at a seat lower side of a buckle device for attaching a tongue of a seat belt of the vehicle seat, and that urges the cord-shaped member in a direction in which the cord-shaped member is retracted, and a holding member that is provided at the vehicle seat, and that holds the urging member in a state in which the urging member is compressed against an urging force; and the retraction device is configured such that, when the buckle device has moved more than a predetermined amount toward a seat width direction outer side, holding by the holding member is released.

According to the disclosure of the third aspect, the retraction device includes the urging member that is provided at the seat lower side of the buckle device for attaching the tongue of the seat belt of the vehicle seat and that urges the cord-shaped member in the direction in which the cord-shaped member is retracted, and the holding member that is provided at the vehicle seat and that holds the urging member in a state in which the urging member is compressed against the urging force. Further, the retraction device is configured such that, when the buckle device has moved more than the predetermined amount toward the seat width direction outer side, holding by the holding member is released.

Namely, the retraction device is configured so as to be actuated due to the buckle device being pushed toward the seat width direction outer side by the occupant moving toward the vehicle width direction inner side due to inertial force. Accordingly, the cord-shaped member can be retracted at an appropriate timing that is different from the inflation and deployment timing of the center airbag, and rotational behavior of the center airbag is suppressed at an appropriate timing that enables the occupant moving toward the vehicle width direction inner side to be effectively restrained. Further, since the retraction device is configured to include the urging member and the holding member, it is possible for the retraction device to be reused.

Further, a vehicle occupant restraint device of a fourth aspect of the present disclosure is the vehicle occupant restraint device of any one of the first aspect to the third aspect, wherein the bifurcated one end portion of the cord-shaped member is attached to a seat front side end portion of the side surface of the center airbag, and the cord-shaped member is arranged substantially in an "F" shape in a side view.

According to the disclosure of the fourth aspect, the bifurcated one end portion of the cord-shaped member is attached to the seat front side end portion of the side surface at the occupant side of the center airbag, and the cord-shaped member is arranged substantially in an "F" shape in a side view. Accordingly, the center airbag is pulled by the cord-shaped member in a more effective posture toward the seat width direction inner side about the rear end portion of the center airbag as a rotational center in a plan view, and therefore, rotational behavior (collapse) toward the seat width direction outer side (rearward and inward in the vehicle width direction) about the rear end portion of the center airbag as a rotational center is suppressed more effectively.

Further, a vehicle occupant restraint device of a fifth aspect of the present disclosure is the vehicle occupant restraint device of the fourth aspect, wherein the cord-shaped member is arranged substantially in an "F" shape in a side view due to being passed through support hole portions that are respectively provided at an upper portion and a lower portion of the side portion of the seat back.

According to the disclosure of the fifth aspect, the cord-shaped member is arranged substantially in an "F" shape in a side view due to being passed through the support hole portions that are respectively provided at the upper portion and the lower portion of the side portion at the vehicle width direction inner side of the seat back. Accordingly, by respectively providing pulleys around which the cord-shaped member is wound at the upper portion and the lower portion of the side portion at the vehicle width direction inner side of the seat back, for example, the configuration thereof is simplified, and an increase in manufacturing cost is suppressed, compared to a case in which the cord-shaped member is arranged substantially in an "F" shape in a side view.

As described above, according to the present disclosure, rotational behavior of a center airbag that inflates and deploys from a side portion at a vehicle width direction inner side of a seat back toward a vehicle width direction inner side of an occupant can be suppressed, even when a vehicle seat is at a front side position.

BRIEF DESCRIPTION OF THE DRAWINGS

Exemplary embodiments of the present disclosure will be described in detail based on the following figures, wherein:

FIG. 4A is a schematic front view illustrating a state when the center airbag of the vehicle occupant restraint device according to the second exemplary embodiment has been inflated and deployed;

FIG. 4B is a schematic front view illustrating a state in which an occupant has moved toward the inflated and deployed center airbag of the vehicle occupant restraint device according to the second exemplary embodiment;

FIG. 5A is a schematic enlarged rear view illustrating a state prior to operation of a retraction device of the vehicle occupant restraint device according to the second exemplary embodiment; and FIG. 5B is a schematic enlarged rear view illustrating a state after operation of the retraction device of the vehicle occupant restraint device according to the second exemplary embodiment.

DETAILED DESCRIPTION

Figure 1:
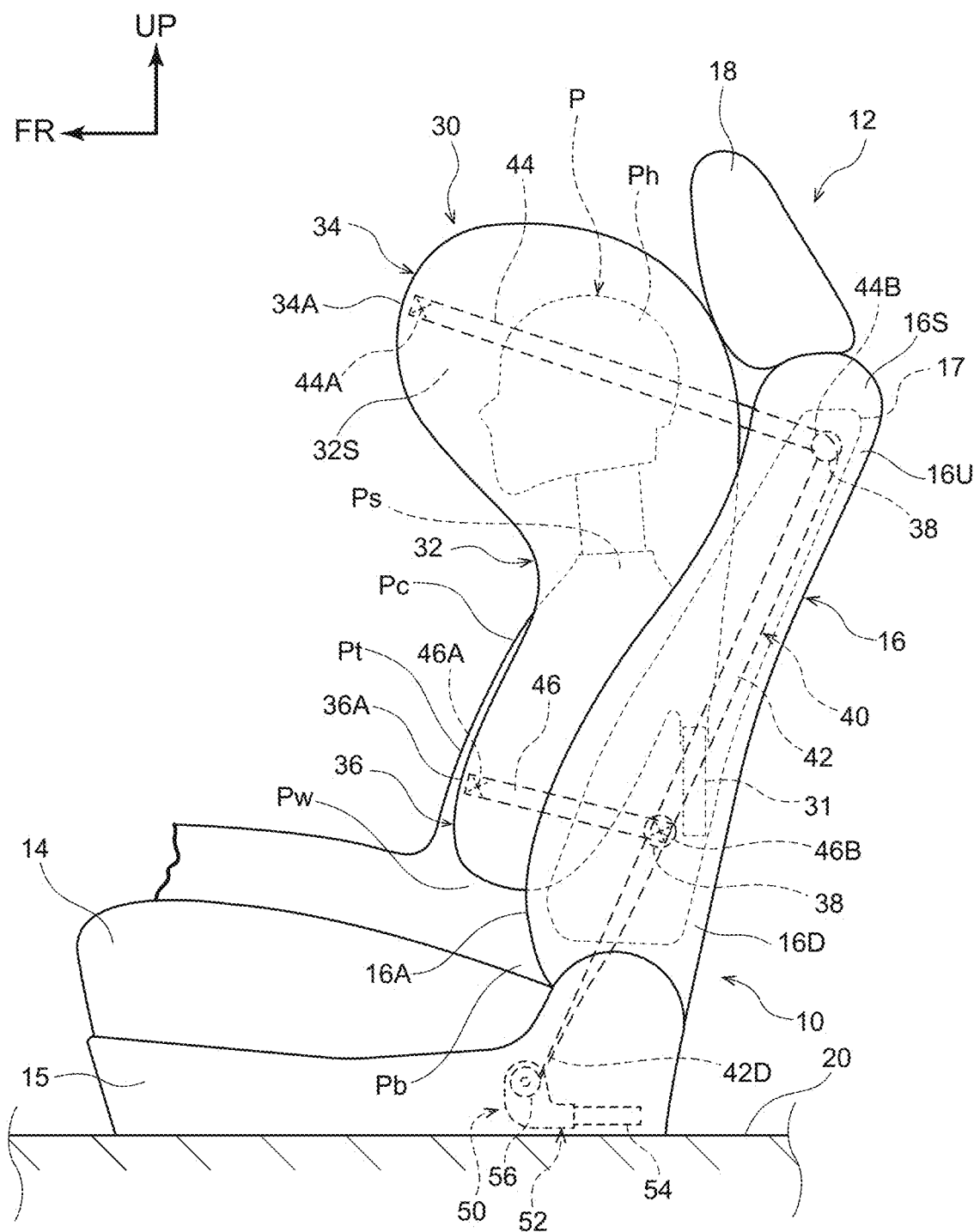
FIG. 1 is a schematic side view illustrating a vehicle seat when a center airbag of a vehicle occupant restraint device according to a first exemplary embodiment has been inflated and deployed.

Below, exemplary embodiments according to the present disclosure will be explained in detail based on the drawings. It should be noted that, for simplicity of explanation, arrow UP illustrated as appropriate in the drawings indicates an upward direction of the vehicle and the vehicle seat, arrow FR indicates a forward direction of the vehicle and the vehicle seat, and arrow RH indicates a rightward direction of the vehicle and the vehicle seat. Accordingly, in the following explanation, in cases in which up-down, front-rear, and left-right directions are described without particular notation to the contrary, these indicate up-down, front-rear, and left-right directions of the vehicle and the vehicle seat. Further, the left-right direction is synonymous with a vehicle width direction and a seat width direction.

Further, an "occupant P" illustrated in FIG. 1 to FIG. 4B is an occupant corresponding to, as an example, an AF05 (5th percentile of American adult women) World Side Impact Dummy (World SID). Namely, the occupant P is an occupant having a small build.

First Exemplary Embodiment

First, explanation follows regarding a first exemplary embodiment. As illustrated in FIG. 1, a vehicle seat 12 configuring a vehicle occupant restraint device 10 according to the first exemplary embodiment includes a seat cushion 14 at which the occupant P is seated (supporting buttocks Pb and thighs of the occupant P), a seat back 16 that supports a back of the occupant P, and a headrest 18 that supports a head Ph of the occupant P. It should be noted that the vehicle seat 12 is, for example, a front right side seat provided in a vehicle cabin of a vehicle, and is configured so as to be movable in the front-rear direction by a known electric mechanism.

In a side view viewed in the vehicle width direction (seat width direction), the seat cushion 14 extends in the front-rear direction, and the seat back 16 is connected at a rear end portion of the seat cushion 14 so as to be rotatable with the seat width direction serving as an axis direction, and extends in the up-down direction. The headrest 18 is provided so as to be able to move up and down at a seat width direction central portion of an upper end portion of the seat back 16. It should be noted that the occupant P is restrained by a seat belt device 22 (refer to FIG. 4) at the vehicle seat 12.

Further, although not illustrated in the drawings, a console box is provided further toward a vehicle width direction inner side than the vehicle seat 12 (at a vehicle width direction central portion) at a floor 20 of the vehicle cabin. The console box is a rectangular hollow box with a longitudinal direction thereof being the front-rear direction in a plan view, and an open upper portion thereof is configured to be openable and closable by a lid portion having a predetermined thickness. It should be noted that a height to an upper surface of the lid portion of the console box is a height that is sufficient to allow the occupant P to place an elbow (not illustrated in the drawings) thereon without adopting an unreasonable posture.

Further, a center airbag device 30 is provided at a side portion at a left side (hereafter referred to as a "left side portion 16S"), which is a side portion at a vehicle width direction inner side of the seat back 16. As illustrated in FIG. 1, the center airbag device 30 is configured to include an inflator 31 that is embedded in the left side portion 16S of the seat back 16, and a center airbag 32 (far side airbag), to an interior of which gas ejected from the inflator 31 is supplied.

The inflator 31 is a cylinder-type gas generating device formed in a substantially cylindrical shape, and an axial direction thereof is a direction (substantially the up-down direction) along a side frame 17 configuring a frame at both left and right side portions of the seat back 16. The inflator 31 is operable when a side collision of the vehicle has been detected or predicted (hereafter referred to as a "time of a side collision") so as to be able to instantaneously supply gas to the interior of the center airbag 32. Consequently, a configuration is provided in which the center airbag 32 is quickly inflated and deployed.

The center airbag 32 is folded and embedded in the left side portion 16S of the seat back 16, and is inflated and deployed toward the vehicle width direction inner side of at least a waist region Pw, an abdominal region Pt, a chest region Pc, a shoulder region Ps, and the head Ph of the occupant P seated in the vehicle seat 12, due to gas that has been ejected from the inflator 31 being supplied to the interior of the center airbag 32.

More specifically, in a side view, the inflated and deployed center airbag 32 is configured so as to be arranged from a vicinity of an upper end portion of the headrest 18 to a vicinity of a lower end portion of the seat back 16, and an upper portion 34 of the center airbag 32 is formed in a substantially elliptical shape that bulges further toward the front side than a lower portion 36, which restrains a lower side of the occupant P from the chest region Pc downward, so as to be able to restrain the head Ph of the occupant P. It should be noted that the center airbag 32 is formed in a single bag shape by sewing outer peripheral edge portions of two base fabrics together.

Further, a strap 40 serving as a cord-shaped member is provided at the upper portion 34 and the lower portion 36 at a side surface 32S of the center airbag 32 at an occupant P side (seat width direction inner side). More specifically, as illustrated in FIG. 1, the strap 40 is formed in a belt shape having a predetermined width, and is arranged substantially in an "F" shape in a side view (including an inverted "F" shape inverted from front to back).

Namely, the strap 40 includes a main body portion 42 extending in substantially the up-down direction along the left side portion 16S of the seat back 16, an upper extending portion 44 integrated with the main body portion 42 and extending in substantially the front-rear direction at an upper portion 34 side of the center airbag 32, and a lower extending portion 46 having a rear end portion 46B thereof attached by sewing to an intermediate portion of the main body portion 42 and extending in substantially the front-rear direction at a lower portion 36 side of the center airbag 32. It should be noted that the strap 40 may also be said to be formed in a shape that is bifurcated from the intermediate portion of the main body portion 42 to which the rear end portion 46B of the lower extending portion 46 is attached by sewing.

A distal end portion 44A, which is one end portion of the upper extending portion 44, is attached by sewing to a front end portion 34A of the upper portion 34 at the side surface 32S of the center airbag 32. The upper extending portion 44 is disposed at a substantially central portion, in the up-down direction, of the upper portion 34 of the center airbag 32 (a portion positioned at a side of the head Ph of the occupant P) obliquely from a distal end portion 44A side thereof toward a rearward lower side (an upper portion 16U of the left side portion 16S of the seat back 16) along the side surface 32S.

The rear end portion 44B of the upper extending portion 44 is inserted through a through hole of a ring portion 38 provided at the upper portion 16U of the left side portion 16S of the seat back 16, extends toward the lower side at a substantially right angle, and is integral with the main body portion 42. Consequently, the upper extending portion 44 of the strap 40 is configured to be movably supported by the left side portion 16S of the seat back 16. It should be noted that the ring portion 38 is provided at the side frame 17 of the seat back 16, and that the through hole thereof is a support hole portion.

A distal end portion 46A, which is one end portion of the lower extending portion 46, is attached by sewing to a front end portion 36A of the lower portion 36 at the side surface 32S of the center airbag 32. The lower extending portion 46 is disposed at a lower side portion of the lower portion 36 of the center airbag 32 (a portion positioned at a side of the abdominal region Pt of the occupant P) obliquely from the distal end portion 46A side thereof toward a rearward lower side (a lower portion 16D of the left side portion 16S of the seat back 16) along the side surface 32S.

The intermediate portion of the main body portion 42 to which the rear end portion 46B of the lower extending portion 46 is sewn is inserted through a through hole of a ring portion 38 provided at the lower portion 16D of the seat back 16 and extends toward the lower side, and the rear end portion 46B of the lower extending portion 46 is also configured so as to be inserted through the through hole of the ring portion 38 and extend toward the lower side at a substantially right angle. Consequently, the lower extending portion 46 of the strap 40 is configured to be movably supported by the left side portion 16S of the seat back 16. It should be noted that this ring portion 38 is also provided at the side frame 17 of the seat back 16, and that the through hole thereof is a support hole portion.

Further, each ring portion 38 is configured so as to reduce sliding resistance (friction) at least at a portion where the strap 40 is engaged so as to enable the strap 40 to move smoothly toward the lower side when the strap 40 is retracted toward the lower side by a retraction device 50, which will be described later. Furthermore, a length of the upper extending portion 44 is longer than a length of the lower extending portion 46 in accordance with inflation and deployment lengths of the upper portion 34 and the lower portion 36 of the center airbag 32 along substantially the front-rear direction. Consequently, a configuration is provided in which the strap 40 is arranged in substantially an "F" shape in side view.

A lower end portion (other end portion) 42D of the main body portion 42 of the strap 40 is attached to the retraction device 50. The retraction device 50 is configured by a known pretensioner device 52 provided at a seat side garnish 15 (or alternatively a vehicle body, which is not illustrated in the drawings) that covers a seat width direction outer side of a lower portion side of the seat cushion 14. The pretensioner device 52 is configured so as to instantaneously retract the strap 40 toward the lower side at a timing at which the occupant P is restrained by the inflated and deployed center airbag 32.

More specifically, the pretensioner device 52 includes a gas generator 54, a rack gear (not illustrated in the drawings) that instantaneously moves due to the gas generator 54 being operated, and a pinion gear (not illustrated in the drawings) that meshes with the rack gear. The lower end portion 42D of the main body portion 42 of the strap 40 is attached to an outer peripheral surface of a cylindrical winding portion 56 provided coaxially with the pinion gear so as to be capable of being wound.

Accordingly, when the gas generator 54 is operated at a timing at which the occupant P is restrained by the inflated and deployed center airbag 32, due to operation of the gas generator 54, the pinion gear rotates via the rack gear, and the winding portion 56 provided coaxially with the pinion gear rotates so as to wind the main body portion 42 of the strap 40 and retract the main body portion 42 toward the lower side.

Figure 2A:
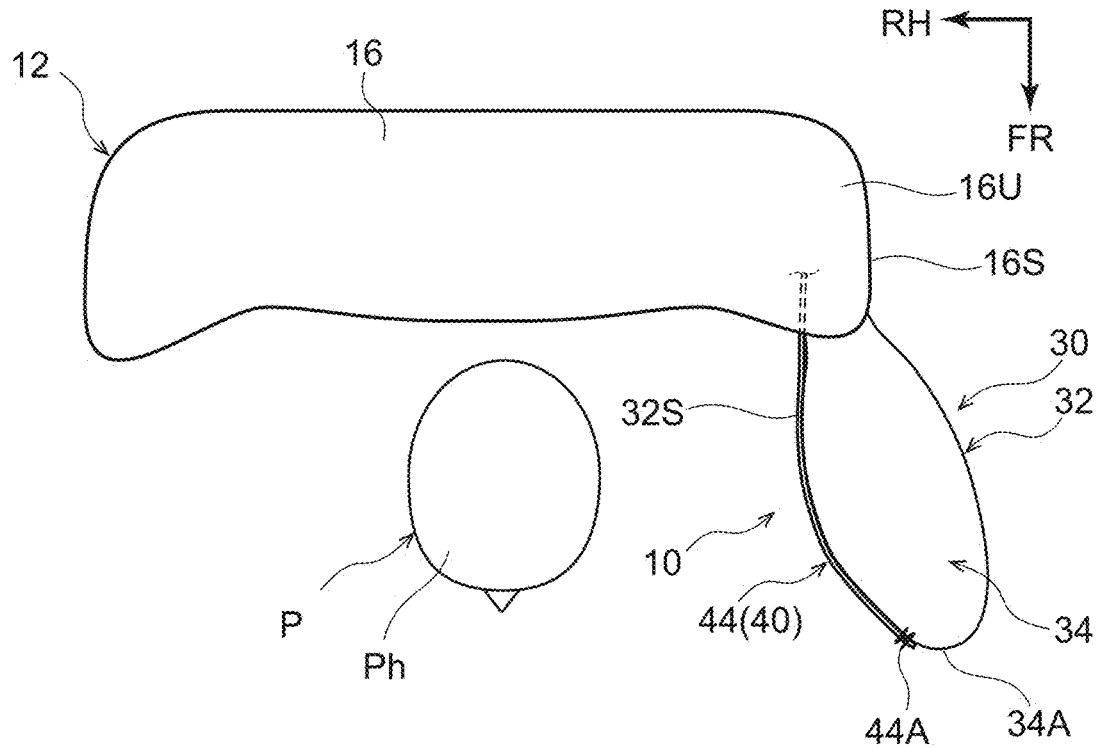
FIG. 2A is a schematic plan view illustrating a state when the center airbag of the vehicle occupant restraint device according to the first exemplary embodiment has been inflated and deployed.

Namely, in the strap 40, the upper extending portion 44, which is integral with the main body portion 42, and the lower extending portion 46, whose rear end portion 46B is attached to the intermediate portion of the main body portion 42, are pulled toward the rear side. As a result, as illustrated in FIG. 2, a configuration is provided in which the inflated and deployed center airbag 32 is pulled toward the seat width direction inner side (is caused to rotate toward the seat width direction inner side about the rear end portion thereof in a plan view).

It should be noted that a "timing at which the occupant P is restrained by the inflated and deployed center airbag 32" herein refers to, for example, a time when a buckle device 28 (refer to FIG. 3), which will be described later, has moved toward the seat width direction outer side in excess of a predetermined amount due to being pushed by the occupant P who has moved toward the vehicle width direction inner side due to inertial force, and is 10 msec after completion of inflation and deployment of the center airbag 32.

Next, explanation follows regarding operation of the vehicle occupant restraint device 10 according to the first exemplary embodiment configured as described above.

At the time of a side collision of the vehicle, the inflator 31 is activated, and gas that has been ejected from the inflator 31 is supplied to the interior of the center airbag 32. Then, due to internal pressure (inflation pressure) of the center airbag 32 that has begun to inflate due to the supply of this gas, an epidermis extending from the lower end portion to the upper end portion of the left side portion 16S of the seat back 16 is broken.

Namely, the center airbag 32 inflates and deploys toward a left side surface (the vehicle width direction inner side) of the waist region Pw, the abdominal region Pt, the chest region Pc, the shoulder region Ps, and the head Ph of the occupant P. As a result, the left side surface from the waist region Pw to the head Ph of the occupant P is covered from the left side by the center airbag 32. Accordingly, at the time of a side collision of the vehicle, the left side surface from the head Ph to the waist region Pw of the occupant P moving toward the vehicle width direction inner side due to inertial force can be restrained by the center airbag 32.

When the occupant P seated in the vehicle seat 12 (particularly the driver's seat) is an occupant having a small build, the vehicle seat 12 may be at a front side position at which a front end surface 16A at the lower portion 16D side of the left side portion 16S of the seat back 16 is positioned further toward the front side than a front surface of the console box in a side view. In this case, the inflated and deployed center airbag 32 is less likely to obtain a reaction force from the console box.

However, the respective distal end portions 44A, 46A of the upper extending portion 44 and the lower extending portion 46 of the strap 40, which are configured in a bifurcated shape, are respectively attached to the upper portion 34 and the lower portion 36 of the side surface 32S at the occupant P side of the center airbag 32, and the strap 40 is supported so as to be movable at the left side portion 16S of the seat back 16.

The lower end portion 42D of the main body portion 42 of the strap 40 is attached to the pretensioner device 52 serving as the retraction device 50, and the strap 40 is retracted toward the lower side by the pretensioner device 52 at a timing at which the occupant P, who has moved toward the vehicle width direction inner side due to inertial force, is restrained by the inflated and deployed center airbag 32. Namely, the upper extending portion 44 and the lower extending portion 46 of the strap 40 are pulled toward the rear side.

Figure 2B:
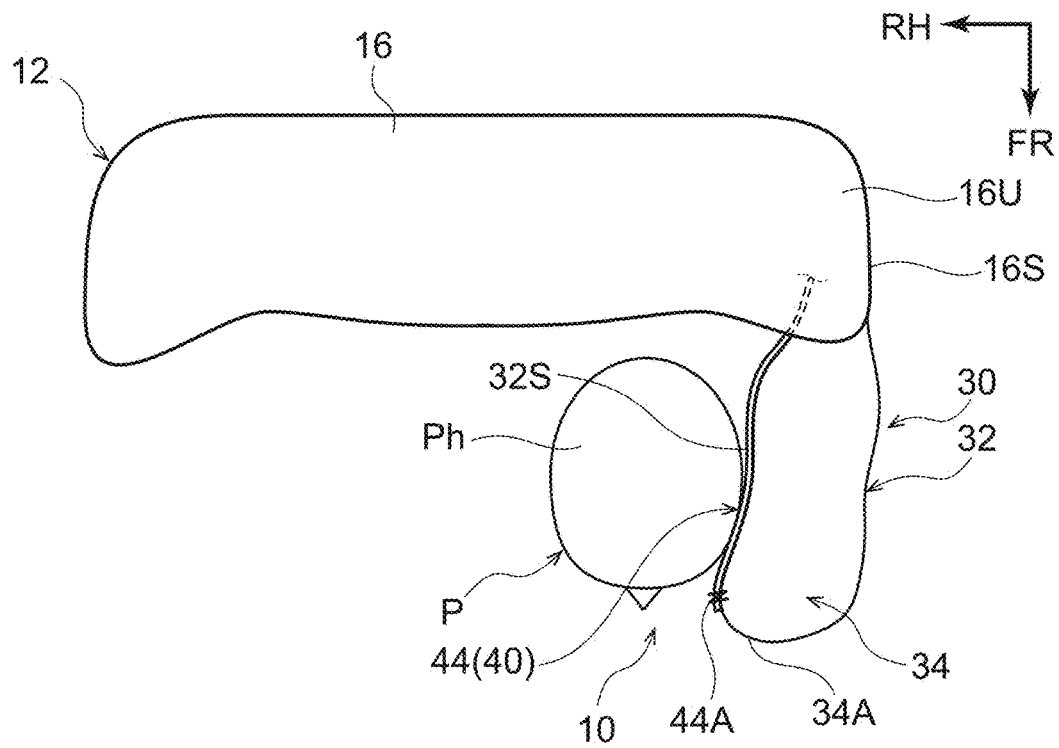
FIG. 2B is a schematic plan view illustrating a state in which the inflated and deployed center airbag of the vehicle occupant restraint device according to the first exemplary embodiment has been pulled by a strap.

Accordingly, even if the lower end portion of the center airbag 32 does not sufficiently overlap with the console box in a side view (even if the lower end portion of the center airbag 32 is shifted toward the front side), the center airbag 32 is pulled toward the seat width direction inner side by the strap 40 about the rear end portion of the center airbag 32 as a rotational center (with the inflator 31 side serving as a pivot point) in a plan view, and therefore, rotational behavior (collapse) of the center airbag 32 toward the seat width direction outer side (inward and rearward in the vehicle width direction) about the rear end portion of the center airbag 32 as a rotational center can be suppressed (refer to FIG. 2B).

Namely, even when the vehicle seat 12 is at the front side position, rotational behavior of the center airbag 32 that inflates and deploys from the left side portion 16S of the seat back 16 toward the vehicle width direction inner side of the occupant P can be suppressed, and the occupant P is effectively restrained by the center airbag 32. As described above, due to the center airbag 32 according to the first exemplary embodiment, the occupant P can be effectively restrained (restraining performance with respect to the occupant P can be ensured) regardless of the position of the vehicle seat 12.

Moreover, since the retraction device 50 is configured by the pretensioner device 52 provided at the vehicle seat 12, the strap 40 can be retracted at an appropriate timing that is different from the inflation and deployment timing of the center airbag 32, as compared to a case in which the retraction device 50 is not configured by the pretensioner device 52, and rotational behavior of the center airbag 32 can be suppressed at an appropriate timing that enables the occupant P moving toward the vehicle width direction inner side due to inertial force to be effectively restrained.

Further, the strap 40 is arranged substantially in an "F" shape in a side view, with the respective distal end portions 44A, 46A of the upper extending portion 44 and the lower extending portion 46 being attached to the respective front end portions 34A, 36A of the upper portion 34 and the lower portion 36 of the side surface 32S at the occupant P side of the center airbag 32. Accordingly, the center airbag 32 is pulled by the strap 40 in a more effective posture toward the seat width direction inner side about the rear end portion of the center airbag 32 as a rotational center in a plan view, and therefore, rotational behavior (collapse) toward the seat width direction outer side (rearward and inward in the vehicle width direction) about the rear end portion of the center airbag 32 as a rotational center can be suppressed more effectively.

Moreover, the strap 40 is arranged substantially in an "F" shape in side view by being passed through through holes (support hole portions) of the ring portions 38 respectively provided at the upper portion 16U and the lower portion 16D of the left side portion 16S of the seat back 16. Accordingly, by respectively providing pulleys (not illustrated in the drawings) around which the strap 40 is wound at the upper portion 16U and the lower portion 16D of the left side portion 16S of the seat back 16, for example, the configuration thereof can be simplified, and an increase in manufacturing cost can be suppressed, compared to a case in which the strap 40 is arranged substantially in an "F" shape in a side view.

Second Exemplary Embodiment

Next, explanation follows regarding a second exemplary embodiment. It should be noted that components that are equivalent to those of the first exemplary embodiment described above are given the same reference numerals, and that detailed explanation thereof is omitted as appropriate.

Figure 3:
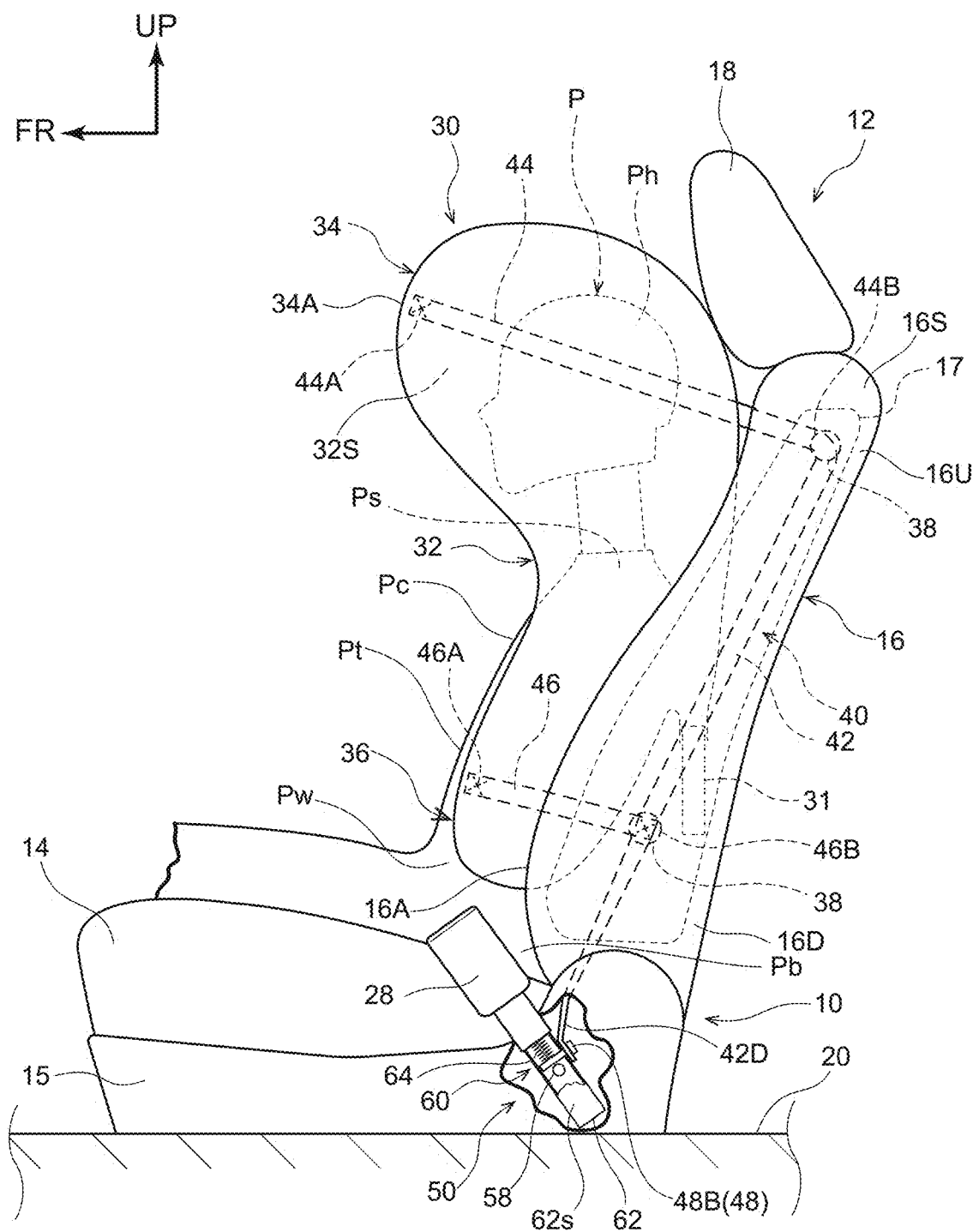
FIG. 3 is a schematic side view illustrating a vehicle seat when a center airbag of a vehicle occupant restraint device according to a second exemplary embodiment has been inflated and deployed.

As illustrated in FIG. 3 to FIG. 5B, in the second exemplary embodiment, only the configuration of the retraction device 50 is different from the first exemplary embodiment described above. As illustrated in FIG. 3, FIG. 4A and FIG. 4B, the retraction device 50 of the second exemplary embodiment is configured by an urging mechanism 60 provided at a lower side of the buckle device 28 for attaching a tongue 26 of a seat belt 24 of the seat belt device 22.

More specifically, as illustrated in FIG. 5A and FIG. 5B, the urging mechanism 60 is configured to include a holder 62 that is integrally attached to a lower side of the buckle device 28, and a compression coil spring (hereafter simply referred to as a "coil spring") 64 serving as an urging member that is housed at an interior of the holder 62.

The holder 62 is formed in a bottomed substantially rectangular cylindrical shape having an axial direction in the up-down direction, and an upper end portion thereof is integrally joined and attached to a lower end portion of the buckle device 28. It should be noted that an upper end portion of a supporting member, which is not illustrated in the drawings, is attached to a lower end portion of the holder 62, and that a lower end portion of the supporting member is attached to the seat side garnish 15 (or alternatively the vehicle body, which is not illustrated in the drawings). A slit portion 62A having a predetermined width (a width that is substantially the same as a diameter of a movable pin 48, which will be described later) and extending along the axial direction of the holder 62 is formed at a substantially central portion, in the left-right direction, of a rear wall 62B of the holder 62.

An outer peripheral surface of the cylindrical movable pin 48 that has been inserted into the slit portion 62A is integrally joined to a lower end portion of the coil spring 64, and a lower end portion 42D of the main body portion 42 of the strap 40 is attached to a rear end portion 48B of the movable pin 48 that protrudes toward the rear side from the slit portion 62A. As a result, a configuration is provided in which the main body portion 42 of the strap 40 is urged (retracted) toward the lower side by an urging force of the coil spring 64.

Further, a cylindrical holding pin 58 serving as a holding member that protrudes toward a seat width direction outer side with an axial direction thereof being the seat width direction is provided so as to protrude at a predetermined position of the seat side garnish 15. Circular through holes (not illustrated in the drawings) are coaxially formed at both left and right side walls 62S of the holder 62, and the holding pin 58 is inserted through the respective through holes from the seat width direction inner side. A retaining ring member 59 is detachably fitted to a distal end portion of the holding pin 58 that is inserted through the respective through holes and protrudes from one of the side walls 62S of the holder 62.

It should be noted that positions of upper end edges of the respective through holes are further toward the lower side than an upper end edge of the slit portion 62A, by the diameter of the movable pin 48. As a result, a configuration is provided in which the movable pin 48, whose outer peripheral surface abuts against the upper end edge of the slit portion 62A, can be held (supported) from the lower side by the holding pin 58 that has been inserted through the respective through holes in the holder 62, when the coil spring 64 has been put in a state in which it has been compressed to substantially a limit against the urging force of the coil spring 64.

As will be described later, when the buckle device 28 has moved by more than a predetermined amount toward a seat width direction outer side, since the holder 62, which is integral with the buckle device 28, also moves by more than the predetermined amount toward the seat width direction outer side, the ring member 59 is pushed off by the one of the side walls 62S of the holder 62, the holding pin 58 is then removed from the respective through holes of the holder 62 (holding thereof is released), and the movable pin 48 is moved toward the lower side by the urging force of the coil spring 64. Namely, the main body portion 42 of the strap 40, whose lower end portion 42D is attached to the rear end portion 48B of the movable pin 48, is retracted toward the lower side by the urging force of the coil spring 64.

Next, explanation follows regarding operation of the vehicle occupant restraint device 10 according to the second exemplary embodiment configured as described above. It should be noted that explanation of operation that is common to the first exemplary embodiment described above is omitted as appropriate.

As illustrated in FIG. 4B, at the time of a side collision of the vehicle, the occupant P moves toward the vehicle width direction inner side due to inertial force. As a result, as illustrated in FIG. 5B, the buckle device 28 moves toward the seat width direction outer side. When the buckle device 28 has moved by more than the predetermined amount toward the seat width direction outer side, the holder 62, which is integral with the buckle device 28, also moves by more than the predetermined amount toward the seat width direction outer side.

As a result, the ring member 59 is pushed off by the one of the side wall 62S of the holder 62, and then the holding pin 58 is removed from the respective through holes of the holder 62 (holding thereof is released). Consequently, the movable pin 48 instantaneously moves toward the lower side due to the urging force of the coil spring 64. Namely, the main body portion 42 of the strap 40, whose lower end portion 42D is attached to the rear end portion 48B of the movable pin 48, is instantaneously retracted toward the lower side by the urging force of the coil spring 64, and the upper extending portion 44 and the lower extending portion 46 of the strap 40 are pulled toward the rear side.

Accordingly, even if the lower end portion of the center airbag 32 does not sufficiently overlap with the console box in a side view, the center airbag 32 is pulled toward the seat width direction inner side by the strap 40 about the rear end portion of the center airbag 32 as a rotational center (with the inflator 31 side serving as a pivot point) in a plan view, and therefore, rotational behavior (collapse) of the center airbag 32 toward the seat width direction outer side (rearward and inward in the vehicle width direction) about the rear end portion of the center airbag 32 as a rotational center can be suppressed.

Namely, even when the vehicle seat 12 is at the front side position, rotational behavior of the center airbag 32 that inflates and deploys from the left side portion 16S of the seat back 16 toward the vehicle width direction inner side of the occupant P can be suppressed, and the occupant P is effectively restrained by the center airbag 32. As described above, due to the center airbag 32 according to the second exemplary embodiment, the occupant P can be effectively restrained (restraining performance with respect to the occupant P can be ensured) regardless of the position of the vehicle seat 12.

Moreover, in the retraction device 50 according to the second exemplary embodiment, the retraction device 50 is actuated due to the buckle device 28 being pushed toward the seat width direction outer side by the occupant P moving toward the vehicle width direction inner side due to inertial force. Accordingly, the strap 40 can be retracted at an appropriate timing that is different from the inflation and deployment timing of the center airbag 32, and rotational behavior of the center airbag 32 can be suppressed at an appropriate timing that enables the occupant P moving toward the vehicle width direction inner side due to inertial force to be effectively restrained. Further, since the retraction device 50 is configured to include the urging mechanism 60 (the holder 62 and the coil spring 64) and the holding pin 58, there is also an advantage of enabling the retraction device 50 to be reused.

Although explanation has been given above regarding the vehicle occupant restraint device 10 according to the present exemplary embodiments, based on the drawings, the vehicle occupant restraint device 10 according to the present exemplary embodiments is not limited to that which is illustrated in the drawings, and appropriate design modification can be carried out within a range that does not depart from the spirit of the present disclosure. For example, in place of the ring portions 38, pulleys (not illustrated in the drawings) or the like, around which the strap 40 is wound, may be provided at the left side portion 16S of the seat back 16. Further, the strap 40 is not limited to one that has a belt shape.

What is claimed is:

1. A vehicle occupant restraint device comprising:
   a vehicle seat, the vehicle seat being provided in a vehicle cabin so as to be movable in a vehicle front-rear direction;
   a center airbag, the center airbag being provided at a side portion at a vehicle width direction inner side of a seat back of the vehicle seat, and the center airbag being configured to inflate and deploy toward a vehicle width direction inner side of an occupant seated at the vehicle seat due to gas that has been ejected from an inflator being supplied to an interior of the center airbag; and
   a cord-shaped member, a bifurcated one end portion of the cord-shaped member being respectively attached to an upper portion and a lower portion of a side surface at an occupant side of the center airbag and being movably supported at the side portion of the seat back, and another end portion of the cord-shaped member being attached to a retraction device and being retracted by the retraction device at a timing at which the occupant is restrained by the inflated and deployed center airbag.

2. The vehicle occupant restraint device according to claim 1, wherein the retraction device is configured by a pretensioner device, the pretensioner device being provided at the vehicle seat or a vehicle body.

3. The vehicle occupant restraint device according to claim 1, wherein:
> the retraction device includes:
>> an urging member, the urging member being provided at a seat lower side of a buckle device for attaching a tongue of a seat belt of the vehicle seat, and the urging member urging the cord-shaped member in a direction in which the cord-shaped member is retracted, and
>> a holding member, the holding member being provided at the vehicle seat, and the holding member holding the urging member in a state in which the urging member is compressed against an urging force; and
>
> the retraction device is configured such that, when the buckle device has moved more than a predetermined amount toward a seat width direction outer side, holding by the holding member is released.

4. The vehicle occupant restraint device according to claim 1, wherein the bifurcated one end portion of the cord-shaped member is attached to a seat front side end portion of the side surface of the center airbag, and the cord-shaped member is arranged substantially in an "F" shape in a side view.

5. The vehicle occupant restraint device according to claim 4, wherein the cord-shaped member is arranged substantially in an "F" shape in a side view due to being passed through support hole portions that are respectively provided at an upper portion and a lower portion of the side portion of the seat back.

* * * * *